(12) United States Patent
Urano et al.

(10) Patent No.: US 9,726,812 B2
(45) Date of Patent: Aug. 8, 2017

(54) ILLUMINATION APPARATUS, DISPLAY APPARATUS, AND ELECTRONIC DEVICE

(71) Applicant: SEIKO EPSON CORPORATION, Tokyo (JP)

(72) Inventors: Nobutaka Urano, Chino (JP); Yoichi Momose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 245 days.

(21) Appl. No.: 14/681,533

(22) Filed: Apr. 8, 2015

(65) Prior Publication Data

US 2015/0212256 A1 Jul. 30, 2015

Related U.S. Application Data

(63) Continuation of application No. 13/553,284, filed on Jul. 19, 2012, now Pat. No. 9,052,430.

(30) Foreign Application Priority Data

Jul. 25, 2011 (JP) .................................. 2011-161707

(51) Int. Cl.
*F21V 7/04* (2006.01)
*F21V 8/00* (2006.01)

(52) U.S. Cl.
CPC ........... *G02B 6/0083* (2013.01); *G02B 6/009* (2013.01); *G02B 6/0068* (2013.01); *G02B 6/0073* (2013.01); *G02B 6/0085* (2013.01)

(58) Field of Classification Search
CPC ........................... G02B 6/0073; G02B 6/0083
See application file for complete search history.

(56) References Cited

U.S. PATENT DOCUMENTS

| 7,434,978 B2 | 10/2008 | Chou |
| 7,956,951 B2 | 6/2011 | Lee |
| 7,976,183 B2 | 7/2011 | Park et al. |
| 2008/0143920 A1 | 6/2008 | Back et al. |

(Continued)

FOREIGN PATENT DOCUMENTS

| CN | 201281267 Y | 7/2009 |
| JP | 2004-165124 A | 6/2004 |

(Continued)

OTHER PUBLICATIONS

Mar. 13, 2015 Office Action issued in U.S. Appl. No. 13/553,284.

(Continued)

*Primary Examiner* — Evan Dzierzynski
(74) *Attorney, Agent, or Firm* — Oliff PLC

(57) ABSTRACT

An illumination apparatus includes: a light guiding plate; a plurality of light-emitting elements disposed along a side-end surface of the light guiding plate that serves as a light-entry portion, each of the plurality of light-emitting elements having a light-emitting surface facing toward the side-end surface; a light source substrate that extends along the light-entry portion and has the plurality of light-emitting elements disposed thereon on one surface side that faces the light-entry portion; and a connector member, held on another surface side of the light source substrate that opposes the one surface side, for supplying power to the plurality of light-emitting elements.

18 Claims, 8 Drawing Sheets

(56) References Cited

U.S. PATENT DOCUMENTS

| | | | |
|---|---|---|---|
| 2009/0323371 A1 | 12/2009 | Ryu et al. | |
| 2010/0007814 A1* | 1/2010 | Kim | G02B 6/0083 349/58 |
| 2010/0118514 A1 | 5/2010 | Cho et al. | |
| 2010/0165662 A1 | 7/2010 | Hamada | |
| 2010/0238684 A1 | 9/2010 | Chiu et al. | |
| 2011/0075443 A1 | 3/2011 | Huang et al. | |
| 2011/0128468 A1 | 6/2011 | Koganezawa | |
| 2011/0170034 A1 | 7/2011 | Jeong | |
| 2011/0170315 A1* | 7/2011 | Chen | G02B 6/0011 362/612 |
| 2011/0273642 A1* | 11/2011 | Kweon | G02B 6/0083 349/62 |

FOREIGN PATENT DOCUMENTS

| | | |
|---|---|---|
| JP | 2005-038768 A | 2/2005 |
| JP | 2007-279480 A | 10/2007 |
| JP | 2010-118348 A | 5/2010 |
| JP | 2012-013723 A | 1/2012 |

OTHER PUBLICATIONS

Jan. 7, 2015 Office Action issued in U.S. Appl. No. 13/553,284.
Aug. 13, 2014 Office Action issued in U.S. Appl. No. 13/553,284.
Apr. 28, 2014 Office Action issued in U.S. Appl. No. 13/553,284.
Dec. 16, 2013 Office Action issued in U.S. Appl. No. 13/553,284.

* cited by examiner

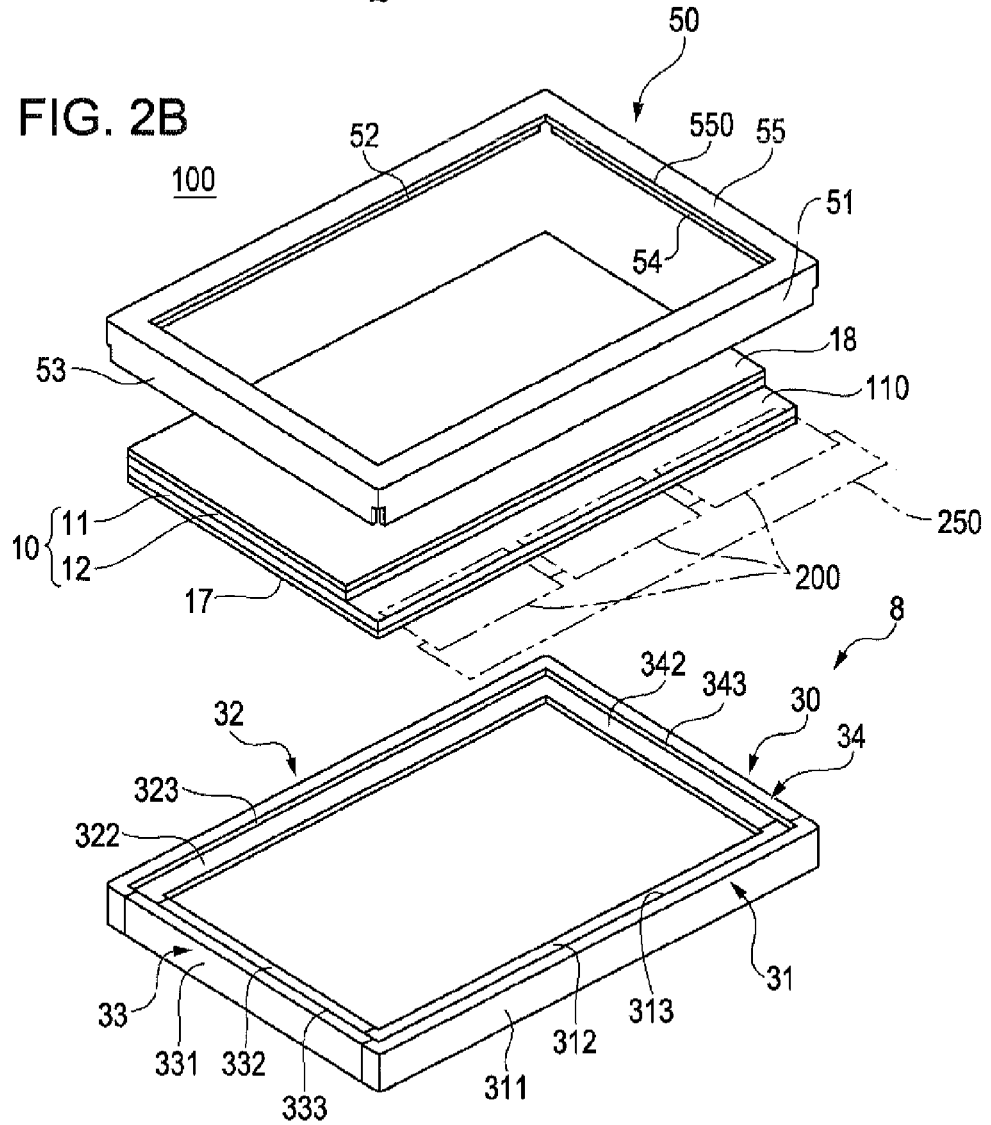

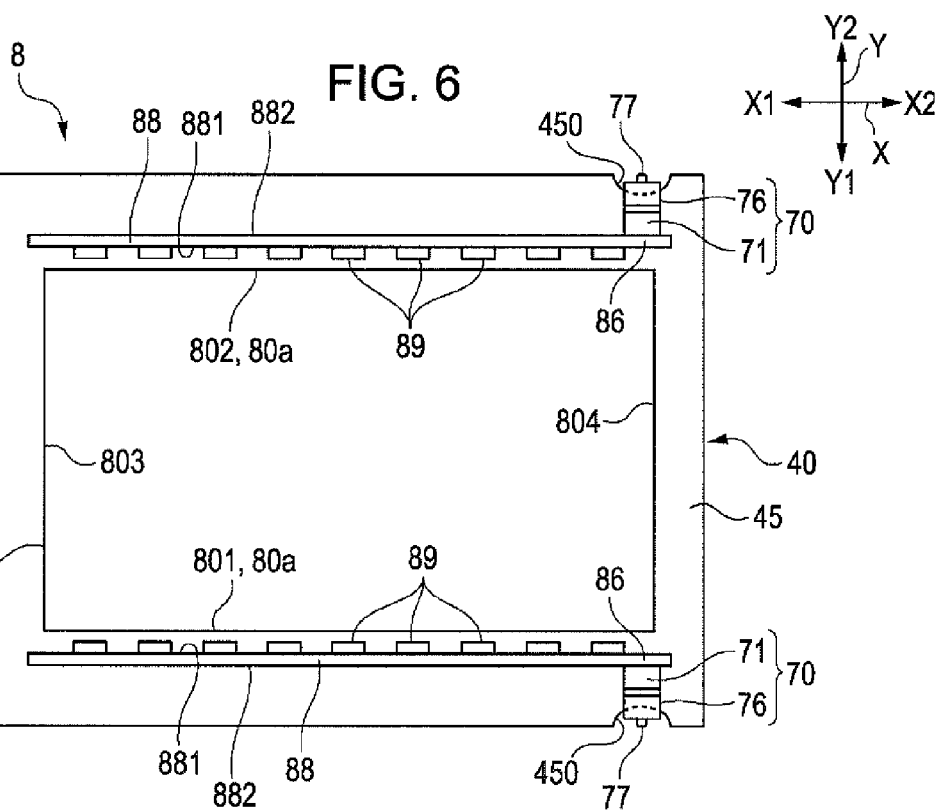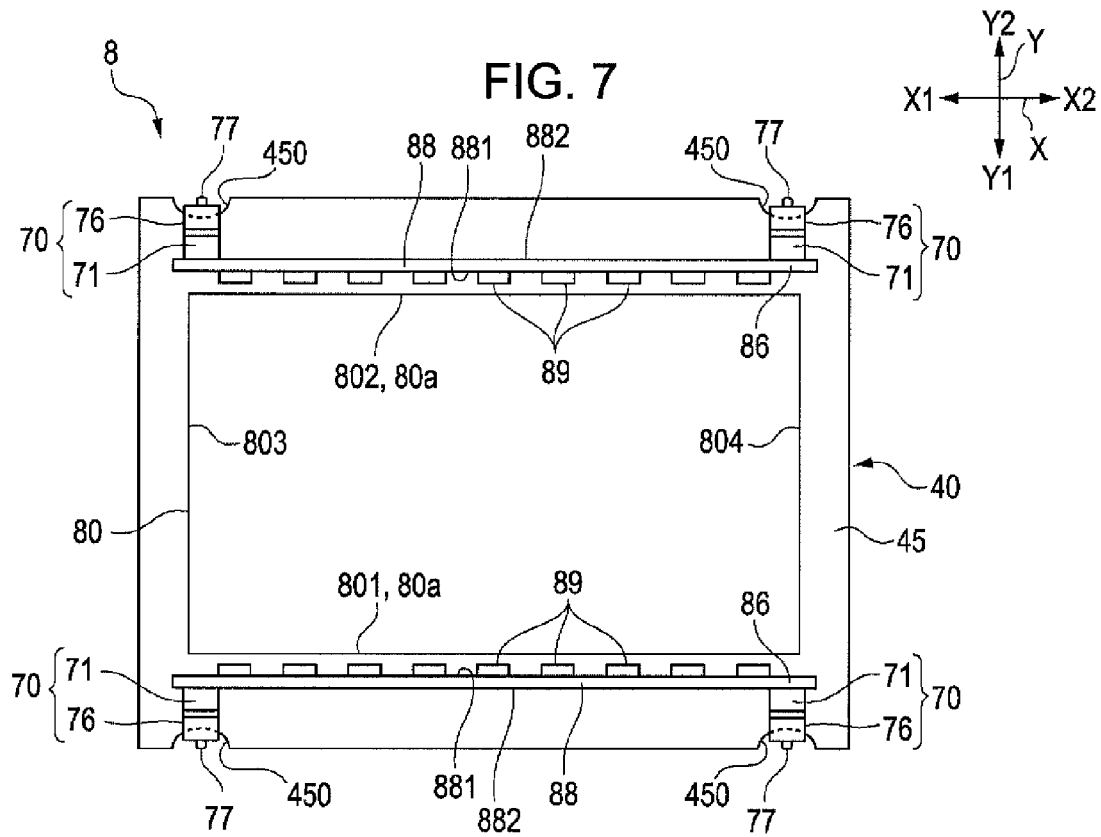

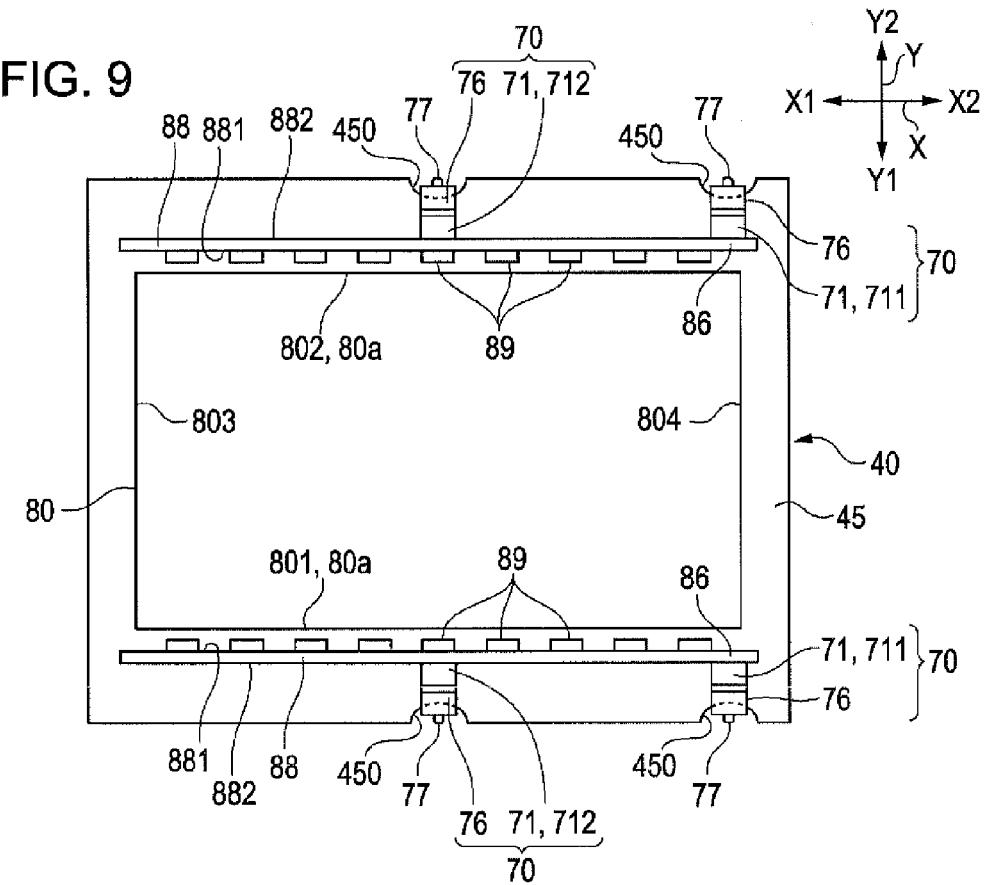
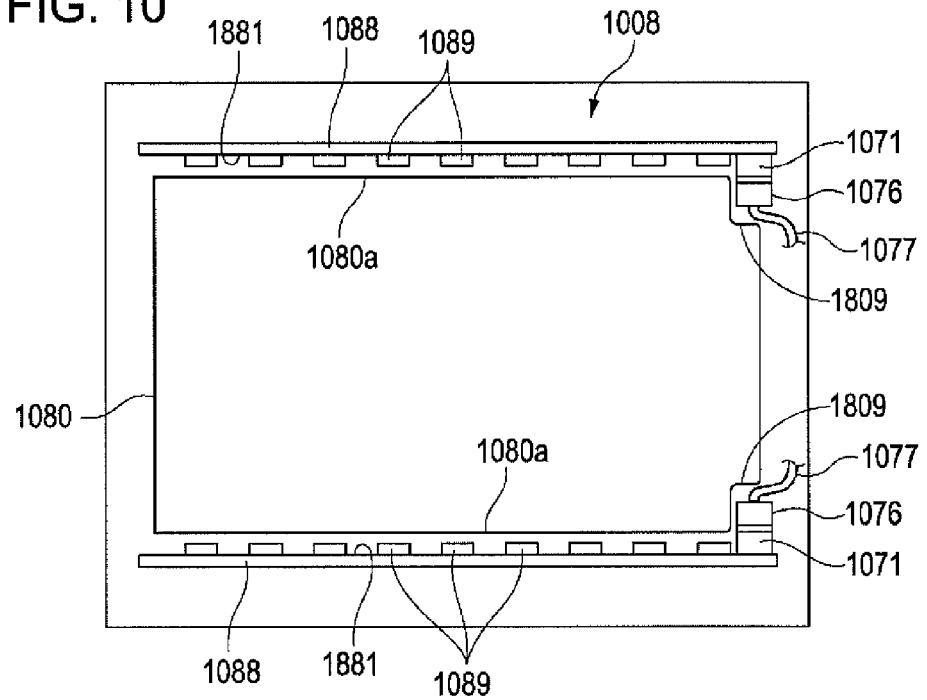

ILLUMINATION APPARATUS, DISPLAY APPARATUS, AND ELECTRONIC DEVICE

CROSS-REFERENCE TO THE RELATED APPLICATIONS

This application is a continuation application of U.S. patent application Ser. No. 13/553,284 filed Jul. 19, 2012, which claims priority to Japanese Patent Application No. 2011-161707 filed Jul. 25, 2011, of which the entire contents are expressly incorporated by reference herein.

BACKGROUND

1. Technical Field

The present invention relates to illumination apparatuses provided with light guiding plates and light-emitting elements, display apparatuses provided with such illumination apparatuses, and electronic devices provided with such display apparatuses.

2. Related Art

Of the various types of display apparatuses, liquid-crystal apparatuses include an illumination apparatus referred to as a "light guiding plate apparatus" and a transmissive or partially-transmissive display panel (liquid-crystal panel) disposed on top of the illumination apparatus in an overlapping manner on the side of the light-emitting surface thereof; in the illumination apparatus, a plurality of light-emitting elements are provided along the side-end surfaces of the light guiding plate that function as light-entry portions. In the illumination apparatus, a light source substrate is provided along the light-entry portion of the light guiding plate, and a plurality of light-emitting elements are mounted on one surface of the light source substrate that opposes the light-entry portion. In addition, flexible wiring such as wires, lead lines, flexible wiring boards, and the like are led out from the light source substrate, and power is supplied to the light-emitting elements via this wiring (JP-A-2007-279480, JP-A-2004-165124, and JP-A-2010-118348). Of JP-A-2007-279480, JP-A-2004-165124, and JP-A-2010-118348, with the illumination apparatus disclosed in JP-A-2007-279480, the leading ends of the wires led out from the light source substrate are connected to a connector member.

With a configuration such as those disclosed in JP-A-2004-165124 and JP-A-2010-118348, in which flexible wiring is simply led out from the light source substrate, electrically connecting the wiring to a light source driving unit requires effort. As opposed to this, if the wiring is connected to a connector member as per the configuration disclosed in JP-A-2007-279480, the electrical connection can be made with ease.

However, even when a connector member is used, when flexible wiring extends from the light source substrate as per the configuration disclosed in JP-A-2007-279480, a large load is applied to the light source substrate via the wiring during assembly, which results in the risk of the light source substrate deforming. If such deformation occurs, the optical axes of the light-emitting elements will tilt, which is undesirable.

Here, the inventors have proposed an illumination apparatus having a structure in which a connector member 1071 is held by a light source substrate 1088, as shown in FIG. 10. More specifically, with an illumination apparatus 1008 shown in FIG. 10, a plurality of light-emitting elements 1089 are provided along a light-entry portion 1080a of a light guiding plate 1080, and the light-emitting elements 1089 are mounted on one surface 1881 of the light source substrate 1088 that extends along the light-entry portion 1080a of the light guiding plate 1080. Meanwhile, the connector member 1071 is also mounted on the one surface 1881 of the light source substrate 1088. Accordingly, when incorporating the illumination apparatus 1008 into a display apparatus, power can be supplied to the light-emitting elements 1089 via the light source substrate 1088 simply by connecting the connector member 1071 to a connector member 1076 that is connected to wiring 1077 extending from the light source driving unit. Accordingly, there is an advantage in that it is not necessary to have flexible wiring extending from the light source substrate 1088.

However, with the configuration shown in FIG. 10, to avoid interference between the light guiding plate 1080 and the connector members 1071 and 1076, it is necessary to provide a cutout 1809 in the light guiding plate 1080, which is problematic in that the illumination area is reduced by that amount. Furthermore, when connecting the connector member 1071 and the connector member 1076 after installing the light source substrate 1088 in the light guiding plate 1080, the light guiding plate 1080 interferes, which is problematic in that it is difficult to carry out the task of connecting the connector member 1071 and the connector member 1076.

SUMMARY

It is an advantage of some aspects of the invention to provide an illumination apparatus having a large illumination area and in which connector members can easily be connected to each other even in the case where the connector members are provided in a light source substrate on which light-emitting elements are mounted, as well as to provide a display apparatus including such an illumination apparatus and an electronic device including such a display apparatus.

An illumination apparatus according to an aspect of the invention includes: a light guiding plate; a plurality of light-emitting elements disposed along a side-end surface of the light guiding plate that serves as a light-entry portion, each of the plurality of light-emitting elements having a light-emitting surface facing toward the side-end surface; a light source substrate that extends along the light-entry portion and has the plurality of light-emitting elements disposed thereon on one surface side that faces the light-entry portion; and a connector member, held on another surface side of the light source substrate that opposes the one surface side, for supplying power to the plurality of light-emitting elements.

According to this aspect of the invention, the plurality of light-emitting elements are mounted on the one surface of the light source substrate, and the connector member is held by the light source substrate; thus power can be supplied to the light-emitting elements via the connector member. It is thus unnecessary to lead flexible wiring out from the light source substrate, and as a result, the light source substrate does not deform due to a large load being applied to the light source substrate via the wiring during assembly. In addition, the connector member is held on the another surface side of the light source substrate. Accordingly, it is not necessary to provide a cutout in the light guiding plate in order to avoid interference between the light guiding plate and the connector member, which increases the illumination area. Furthermore, even in the case where the connector member and a connector member that forms a pair therewith are connected after the light source substrate is disposed relative to the light guiding plate, the light guiding plate does not interfere, and thus the task of connecting the connector members can be carried out with ease.

In the invention, it is preferable for the light-entry portion to extend in a linear shape. In other words, it is preferable for the light-entry portion to extend in a linear manner without a cutout for avoiding interference with the connector member being formed in the light-entry portion; this configuration is advantageous in that a large illumination area can be obtained.

In the invention, it is preferable for the light source substrate to include a support plate that configures the another surface side and a flexible wiring board that has a first part affixed to the support plate on the one surface side and a second part extending along the support plate and over an end thereof; and for the second part of the flexible wiring board to be bent back toward the another surface side and connected to the connector member without being affixed to the one surface side of the support plate. According to this configuration, there is an advantage in that separate wiring need not be extended from the one surface side of the light source substrate toward the connector member on the other surface side.

In the invention, it is preferable for the support plate to be a metal plate. According to this configuration, heat produced by the light-emitting elements can escape via the metal plate.

In the invention, a configuration can be employed in which the connector member is provided further toward an end portion of the light source substrate in a lengthwise direction thereof than a light-emitting element that, of the plurality of light-emitting elements, is located furthest toward the end portion.

In the invention, it is preferable that a configuration be employed in which the connector member is provided within the range of the lengthwise direction of the light source substrate in which the plurality of light-emitting elements are disposed. In other words, in the invention, the connector member is held on the another surface side of the light source substrate; thus the restrictions on the location of the connector member are extremely low, such that the connector member can be provided within the range of the lengthwise direction of the light source substrate in which the plurality of light-emitting elements are arranged and so on. Accordingly, the connector member can be provided in a location suited to supplying power to the light-emitting elements.

In the invention, it is preferable that a configuration be employed in which a plurality of connector members are held on the another surface side of the light source substrate. In other words, in the invention, the connector members are held on the another surface side of the light source substrate, and thus there are extremely few restrictions on the number of connector members, such that a plurality of connector members can be provided and so on. Accordingly, a number of connector members that is suited to supplying power to the light-emitting elements can be provided.

It is preferable that the illumination apparatus according to the invention be used in a display apparatus, and in such a case, the display apparatus include a display panel disposed overlapping a light-emitting surface side of the light guiding plate.

It is preferable that the display apparatus according to the invention be used in an electronic device such as an LCD television.

BRIEF DESCRIPTION OF THE DRAWINGS

The invention will be described with reference to the accompanying drawings, wherein like numbers reference like elements.

FIGS. 2A and 2B are schematic diagrams illustrating the overall configuration of the display apparatus according to the first embodiment of the invention.

FIG. 6 is a schematic diagram illustrating, from above, the configuration of the illumination apparatus of the display apparatus according to the first embodiment of the invention.

FIG. 7 is a schematic diagram illustrating, from above, the configuration of an illumination apparatus of a display apparatus according to a second embodiment of the invention.

FIG. 9 is a schematic diagram illustrating, from above, the configuration of an illumination apparatus of a display apparatus according to a fourth embodiment of the invention.

FIG. 10 is a schematic diagram illustrating, from above, the configuration of an illumination apparatus according to past art.

DESCRIPTION OF EXEMPLARY EMBODIMENTS

Figure 1A:
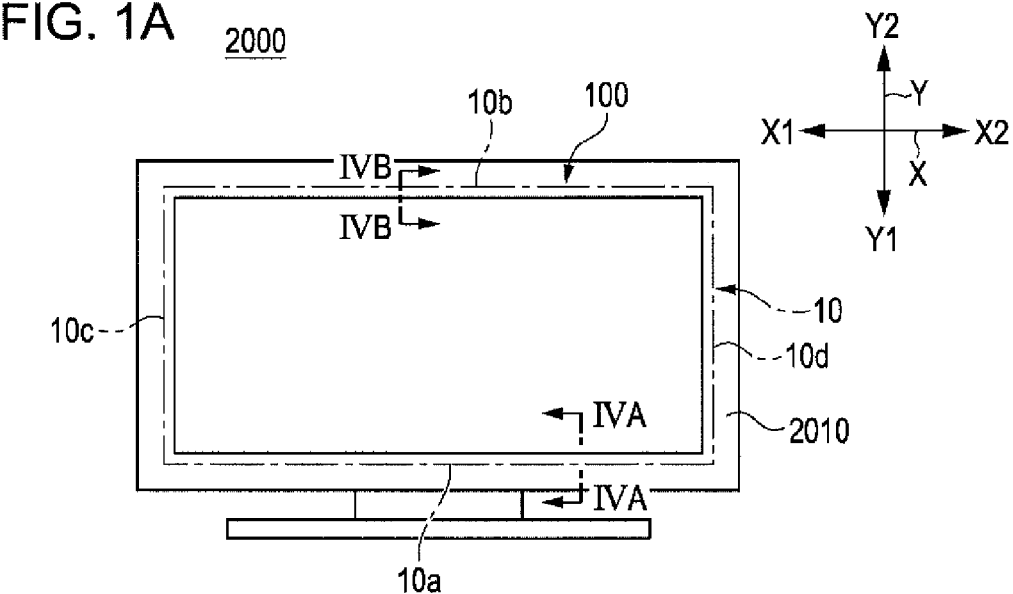
FIGS. 1A and 1B are schematic diagrams illustrating an LCD television (electronic device) provided with a display apparatus according to a first embodiment of the invention.

Embodiments in which the invention has been applied in a display apparatus for an LCD television will be described hereinafter with reference to the drawings. Note that in the drawings referred to in the following descriptions, the dimensions of various layers, members, and so on have been varied in order to illustrate those layers, members, and so on at sizes that can be viewed more easily. It should also be noted that in the following descriptions, the planar directions of a light guiding plate, a liquid-crystal panel, and so on that are orthogonal to each other are taken as the X-axis direction (the direction along which the long side of the light guiding plate, the liquid-crystal panel, or the like (a display panel) extends in the drawings) and the Y-axis direction (the direction along which the short side of the light guiding plate, the liquid-crystal panel, or the like extends in the drawings), and the direction that is orthogonal to both the X-axis direction and the Y-axis direction (the direction along which the light guiding plate and the liquid-crystal panel are layered in the drawings) is taken as the Z-axis direction.

Furthermore, in the drawings referred to hereinafter, one side of the X-axis direction is taken as an X1 side, and the other side is taken as an X2 side; one side of the Y-axis direction (the direction in which an overhang portion of the liquid-crystal panel is disposed) is taken as a Y1 side, and the other direction opposed thereto is taken as a Y2 side; and one side of the Z-axis direction (the direction facing the rear surface of the light guiding plate) is taken as a Z1 side (a bottom side), and the other direction opposed thereto (the side toward which illumination light, display light, and so on are emitted) is taken as a Z2 side (a top side).

First Embodiment

Overall Configuration

Figure 1B:
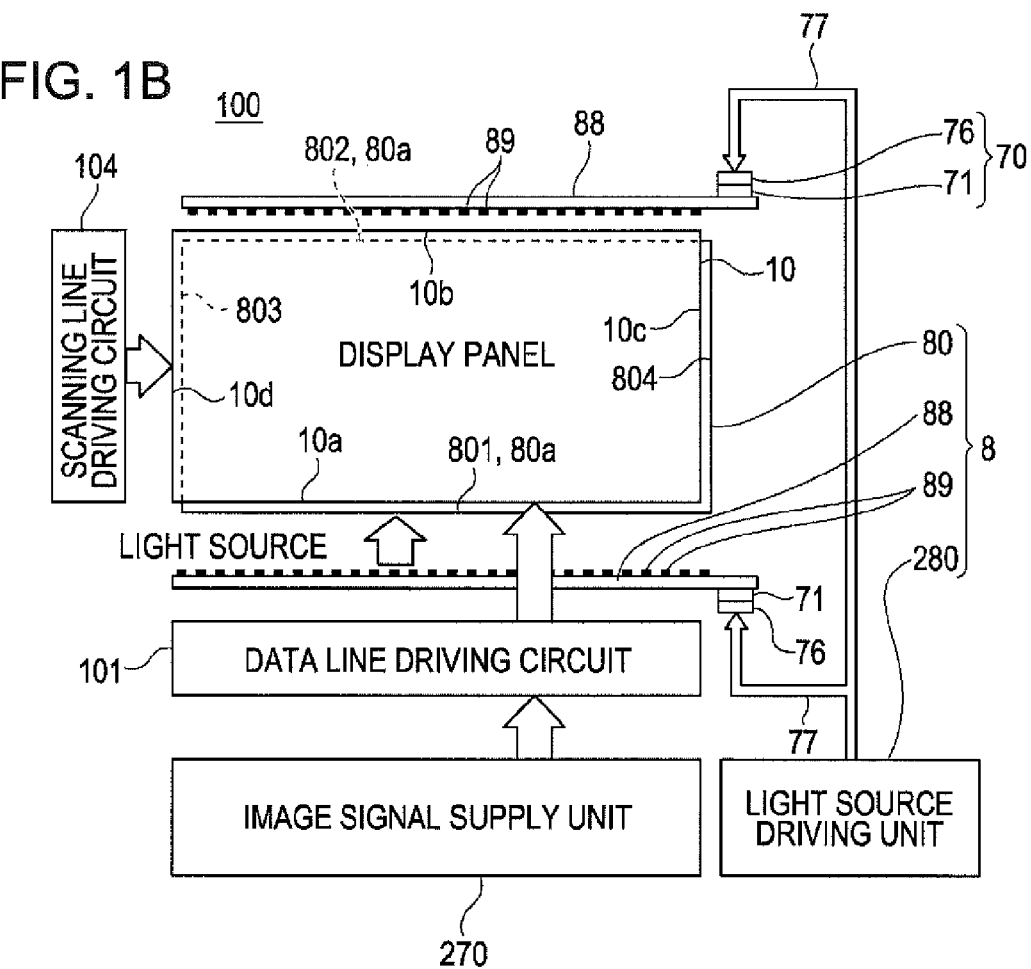

FIGS. 1A and 1B are schematic diagrams illustrating an LCD television (electronic device) provided with a display apparatus according to a first embodiment of the invention, where FIG. 1A is a schematic diagram illustrating the LCD television from the exterior thereof, and FIG. 1B is a block diagram illustrating the electrical configuration of the display apparatus.

An electronic device 2000 shown in FIG. 1A is an LCD television, and includes a display apparatus 100, a television frame 2010, and so on. As shown in FIG. 1B, the display apparatus 100 includes a display panel 10 (a liquid-crystal panel), which will be mentioned later with reference to FIGS. 2A, 2B, and so on, an image signal supply unit 270 that supplies image signals to the display panel 10, and an illumination apparatus 8 that supplies illumination light to the display panel 10. In addition, the display apparatus 100 includes a scanning line driving circuit 104 that drives scanning lines extending in the display panel 10 in the X-axis direction thereof, and a data line driving circuit 101 that drives data lines extending in the display panel 10 in the Y-axis direction thereof. A configuration in which the scanning line driving circuit 104 and the data line driving circuit 101 are both installed in the display panel 10 can be employed. Alternatively, a configuration in which one of the scanning line driving circuit 104 and the data line driving circuit 101 is installed in the display panel 10 and the other is installed in a COG-mounted driving IC in the display panel 10 can be employed. Furthermore, a configuration in which one of the scanning line driving circuit 104 and the data line driving circuit 101 is installed in the display panel 10 and the other is installed in a driving IC mounted on a circuit board that is electrically connected to the display panel 10 can be employed. Further still, a configuration in which both the scanning line driving circuit 104 and the data line driving circuit 101 are installed in a driving IC that is separate from the display panel 10 can be employed.

In this embodiment, the illumination apparatus 8 includes: a light guiding plate 80 disposed so as to overlap with the display panel 10; a plurality of light-emitting elements 89 disposed along side-end surfaces of the light guiding plate 80 that are assigned as light-entry portions 80a; light source substrates 88 on which the plurality of light-emitting elements 89 are mounted; and a light source driving unit 280 that drives the light-emitting elements 89. In this embodiment, the display panel 10 is a laterally-long quadrangle having four sides 10a, 10b, 10c, and 10d. Of the sides 10a, 10b, 10c, and 10d, the side 10a is a long side located on the one side Y1 in the Y-axis direction, the side 10b is a long side located on the other side Y2 in the Y-axis direction, the side 10c is a short side located on the other side X2 in the X-axis direction, and the side 10d is a short side located on the one side X1 in the X-axis direction. In correspondence with this shape, the light guiding plate 80 has four side-end surfaces 801, 802, 803, and 804. Of these side-end surfaces 801, 802, 803, and 804, the side-end surface 801 is located on the long side corresponding to the one side Y1 in the Y-axis direction, the side-end surface 802 is located on the long side corresponding to the other side Y2 in the Y-axis direction, the side-end surface 803 is located on the short side corresponding to the one side X1 in the X-axis direction, and the side-end surface 804 is located on the short side corresponding to the other side X2 in the X-axis direction. In this embodiment, of the four side-end surfaces 801, 802, 803, and 804 of the light guiding plate 80, the two side-end surfaces 801 and 802 that are opposed in the short side direction (the Y-axis direction) serve as the light-entry portions 80a. Accordingly, the light-emitting elements 89 are disposed along each of the two side-end surfaces 801 and 802 (the light-entry portions 80a) in the light guiding plate 80, and the light source substrates 88 extend along the respective two side-end surfaces 801 and 802 (light-entry portions 80a) in the light guiding plate 80.

Note that in this embodiment, the power to the light-emitting elements 89 is supplied by the light source driving unit 280 via wiring 77, a connector 70 configured of connector members 71 and 76, and the light source substrate 88, as will be mentioned later.

Detailed Configuration of Display Apparatus 100

Figure 3:
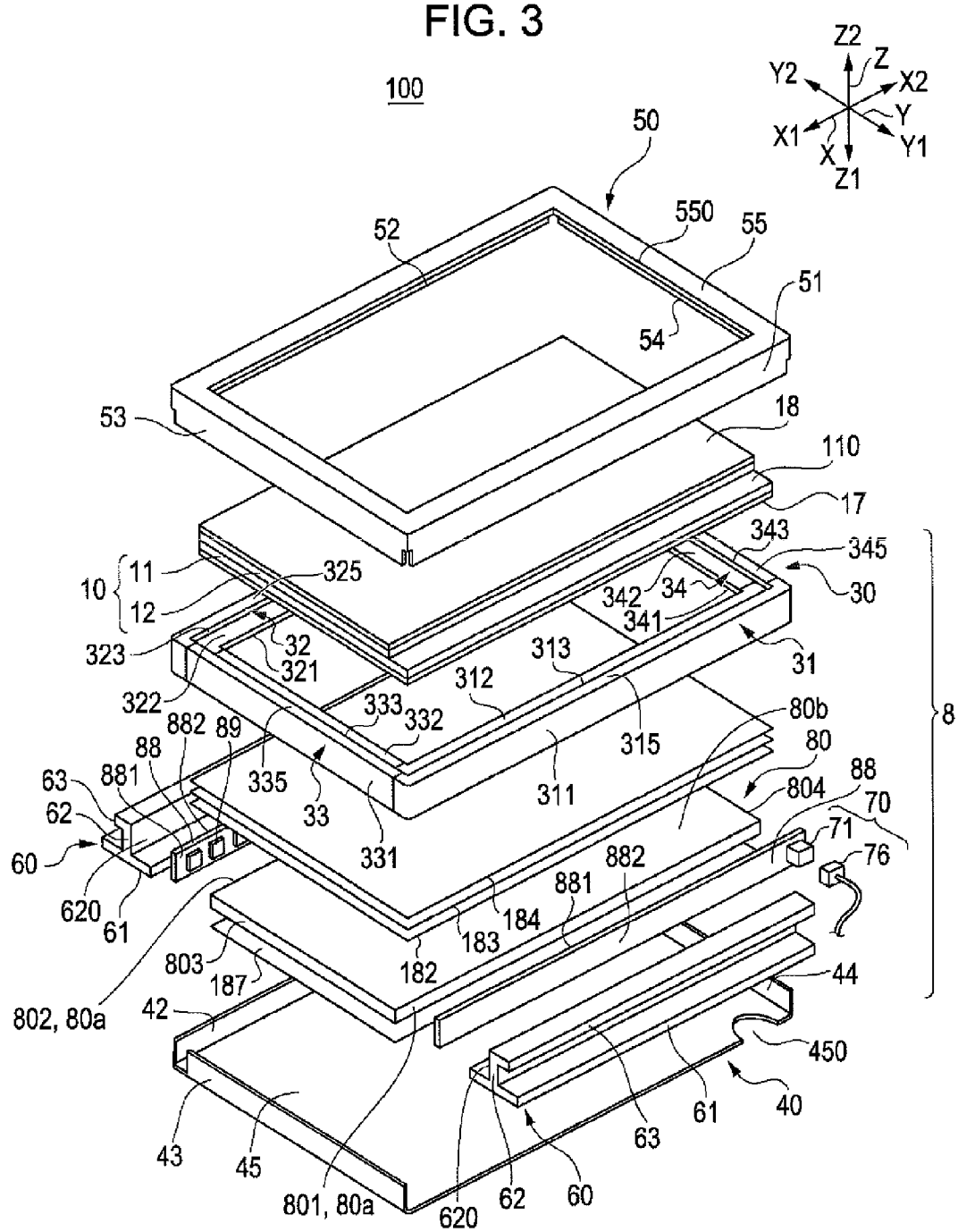
FIG. 3 is an exploded perspective view showing the display apparatus according to the first embodiment of the invention on a more detailed level.
Figure 4A:
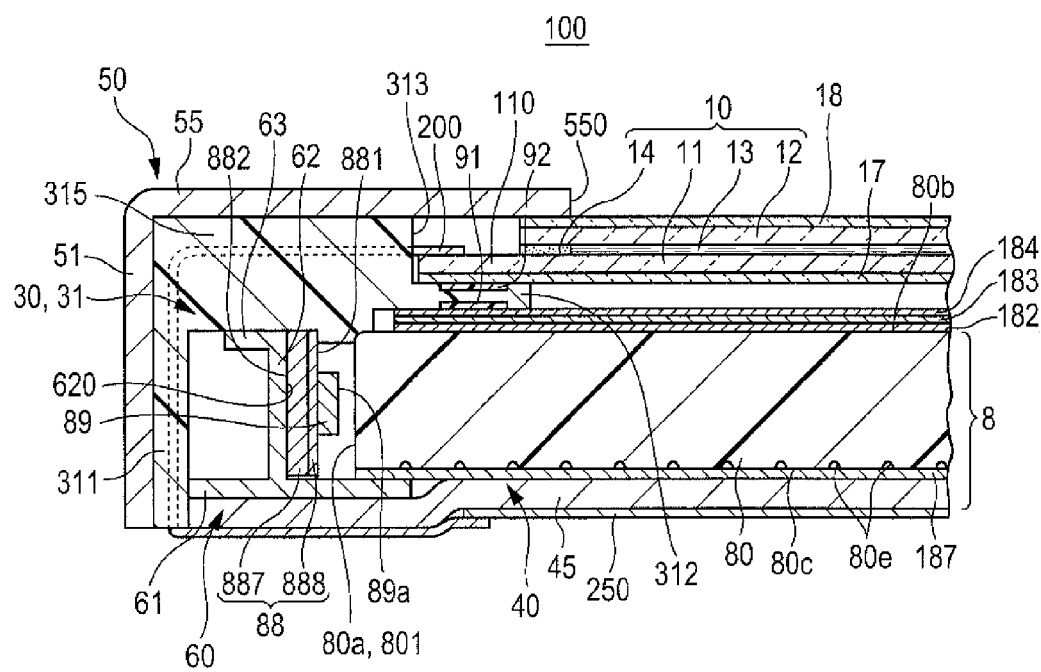
FIGS. 4A and 4B are cross-sectional views illustrating the main elements of the display apparatus according to the first embodiment of the invention.
Figure 4B:
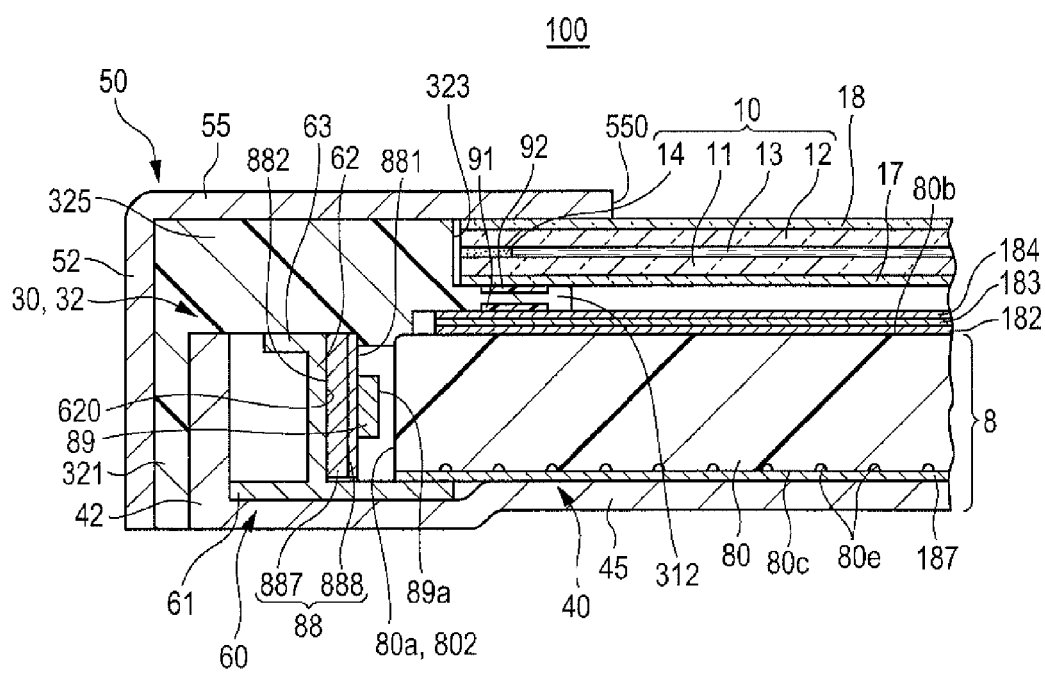

FIGS. 2A and 2B are schematic diagrams illustrating the overall configuration of the display apparatus 100 according to the first embodiment of the invention, and are a perspective view and an exploded perspective view, respectively, of the display apparatus 100. FIG. 3 is an exploded perspective view showing the display apparatus 100 according to the first embodiment of the invention on a more detailed level. FIGS. 4A and 4B are cross-sectional views illustrating the main elements of the display apparatus 100 according to the first embodiment of the invention, and are a cross-sectional view taken along the IVA-IVA line of the display apparatus 100 shown in FIG. 1A and a cross-sectional view taken along the IVB-IVB line of the display apparatus 100 shown in FIG. 1A, respectively.

In FIGS. 2A, 2B, 3, 4A, and 4B, the display apparatus 100 according to this embodiment is, generally speaking, configured of the illumination apparatus 8, which is referred to as a light guiding plate apparatus, and the transmissive type display panel 10, which is disposed so as to overlap with the top surface of the illumination apparatus 8. In this embodiment, the display panel 10 is configured of a transmissive type liquid-crystal panel. In the display apparatus 100, the illumination apparatus 8 includes: a metallic first frame 40 (lower metal frame/metallic frame) disposed so as to cover the rear surface of the light guiding plate 80 on the bottom side (one side Z1 in the Z-axis direction); a resinous second frame 30 (resin frame) that holds the ends of the display panel 10 above the first frame 40 and surrounds and holds the illumination apparatus 8; and a metallic third frame 50 (upper metal frame) disposed on the top side (another side Z2 in the Z-axis direction) of the second frame 30.

The second frame 30 has a rectangular frame shape that holds the ends of the display panel 10 and surrounds the outside of the display panel 10, and in this embodiment, the second frame 30 is configured of four frame plates 31, 32, 33, and 34 that are divided into four side sections corresponding to the four sides of the display panel 10. In this embodiment, the second frame 30 is black, and prevents the occurrence of stray light within the illumination apparatus 8 by functioning as a light absorption member. The frame plates 31, 32, 33, and 34 respectively include: side plate portions 311, 321, 331, and 341 that extend downward from the outer surface sides of the frame plates 31, 32, 33, and 34; upper plate portions 315, 325, 335, and 345 (end plate portions) that are bent inward from the upper edges of the side plate portions 311, 321, 331, and 341, respectively; and protruding plate portions 312, 322, 332, and 342 that protrude inward from a position partway along the height direction of the upper plate portions 315, 325, 335, and 345, respectively. Accordingly, step portions 313, 323, 333, and 343 are formed by the protruding plate portions 312, 322, 332, and 342 on the inner sides of the frame plates 31, 32, 33, and 34, respectively, and the display panel 10 is held by the step portions 313, 323, 333, and 343 and the protruding plate portions 312, 322, 332, and 342. Meanwhile, the light guiding plate 80, the light-emitting elements 89, and so on of the illumination apparatus 8 are disposed on the bottom side of the protruding plate portion 312.

The first frame 40 is formed through press-machining a thin metal plate such as SUS or the like. The first frame 40 includes a base plate portion 45 and three side plate portions 42, 43, and 44 that stand erect from the three outer edges of the base plate portion 45 aside from the edge corresponding to the one side Y1 in the Y-axis direction, and has a rectangular box-shape whose top surface is open. The side plate portions 321, 331, and 341 of the second frame 30 overlap on the outside of the side plate portions 42, 43, and 44, respectively, of the first frame 40. Meanwhile, the side plate portion 311 of the second frame 30 covers the one side Y1 of the first frame 40 in the Y-axis direction.

The third frame 50 is, like the first frame 40, formed through press-machining a thin metal plate such as SUS or the like. The third frame 50 includes a rectangular upper plate portion 55 (end plate portion) and four side plate portions 51, 52, 53, and 54 formed by bending the outer edges of the upper plate portion 55 downward, and has a rectangular box-shape whose bottom surface is open. The side plate portions 51, 52, 53, and 54 overlap on the outside of the side plate portions 311, 321, 331, and 341, respectively, of the second frame 30. A rectangular window 550 that emits the light emitted from the display panel 10 is formed in the upper plate portion 55, and the upper plate portion 55 covers the entire circumference of the outer circumferential edges of the side of the display panel 10 that emits display light.

The third frame 50, second frame 30, and first frame 40 configured in this manner are connected using screws (not shown), and the display panel 10, illumination apparatus 8, and so on are held therein as a result. Here, as shown in FIGS. 4A and 4B, flexible sheets 91 and 92 are affixed to the bottom surface and top surface, respectively, of the protruding plate portions 312, 322, 332, and 342 of the second frame 30. Accordingly, when the display apparatus 100 is assembled, the display panel 10 is supported by the protruding plate portions 312 through 342 via the flexible sheet 92. Likewise, when the display apparatus 100 is assembled, the illumination apparatus 8 is supported via the flexible sheet 91. Furthermore, when the display apparatus 100 is assembled, an optical sheet of the illumination apparatus 8 (a diffusion sheet 182, prism sheets 183 and 184, and so on) is suppressed from lifting, positional skewing, and so on via the flexible sheet 91.

Configuration of Display Panel 10

As shown in FIGS. 2A, 2B, 3, 4A, and 4B, the display panel 10 includes: an element substrate 11 having a planar quadrangular shape and in which pixel electrodes (not shown) and the like are formed; an opposing substrate 12 disposed opposite to the element substrate 11 with a predetermined gap provided therebetween; and a sealant 14 that affixes the opposing substrate 12 and the element substrate 11 to each other. In the display panel 10, a liquid-crystal layer 13 is held within a region surrounded by the sealant 14. The element substrate 11 and the opposing substrate 12 are configured of light-transmissive substrates such as glass substrates. In the element substrate 11, a plurality of scanning lines (not shown) extend along the X-axis direction, whereas a plurality of data lines extend along the Y-axis direction; switching elements (not shown) and pixel electrodes are provided corresponding to each location where the scanning lines and data lines intersect (not shown).

In this embodiment, the opposing substrate 12 is disposed on the side toward which display light is emitted, and the element substrate 11 is disposed on the side of the illumination apparatus 8. Meanwhile, a frame-shaped layer (not shown) configured of a light-blocking layer is formed on the surface of the opposing substrate 12 that is opposed to the element substrate 11 so as to follow the inner edges of the sealant 14. The display panel 10 is configured of a TN (twisted nematic), ECB (electrically-controlled birefringence), or VAN (vertical aligned nematic) liquid-crystal panel; the pixel electrodes are formed in the element substrate 11, and a common electrode (not shown) is formed in the opposing substrate 12. Note that in the case where the display panel 10 is an IPS (in-plane switching) or FFS (fringe field switching) liquid-crystal panel, the common electrode is provided in the element substrate 11. The element substrate 11 may also be disposed on the side of the opposing substrate 12 toward which the display light is emitted. An upper polarization plate 18 is disposed overlapping the upper surface of the display panel 10, and a lower polarization plate 17 is disposed between the lower surface of the display panel 10 and the illumination apparatus 8.

In this embodiment, the element substrate 11 is larger than the opposing substrate 12. Accordingly, the element substrate 11 includes an overhang portion 110 that extends past the end portion of the opposing substrate 12 on the one side Y1 in the Y-axis direction, and a plurality of flexible wiring boards 200 are connected to the top surface of the overhang portion 110. The flexible wiring boards 200 are connected to a circuit board 250 configured of a rigid board, and a control IC (not shown) that configures the image signal supply unit 270 described with reference to FIGS. 1A and 1B, a light source driving IC (not shown) that configures the light source driving unit 280, and so on are mounted on the circuit board 250.

Configuration of Illumination Apparatus 8

Figure 5A:
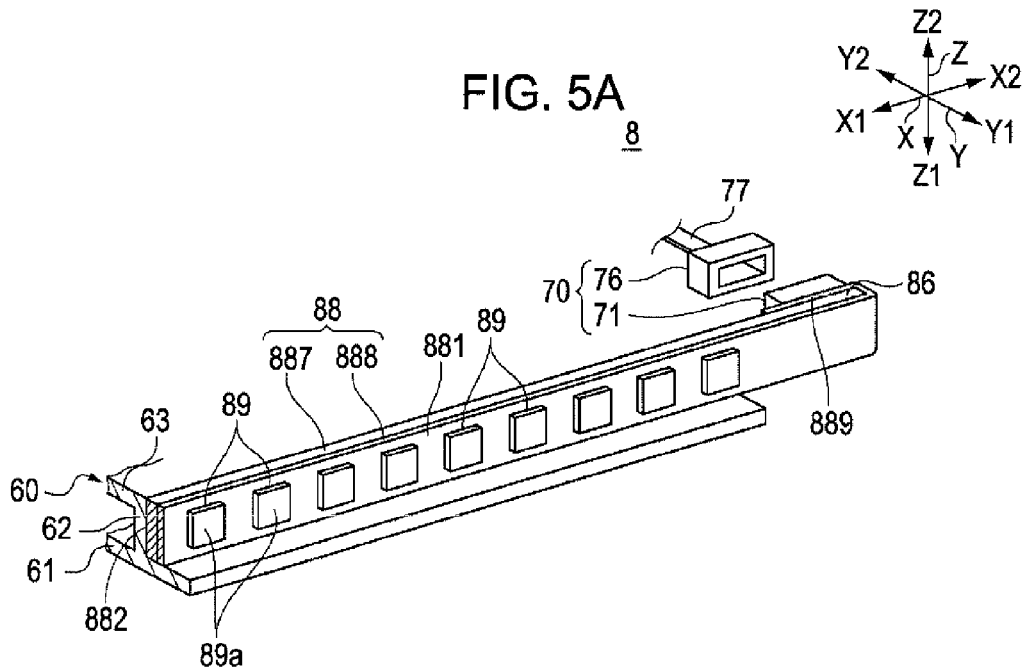
FIGS. 5A and 5B are schematic diagrams illustrating the configuration in the vicinity of a light source substrate used in an illumination apparatus of the display apparatus according to the first embodiment of the invention.
Figure 5B:
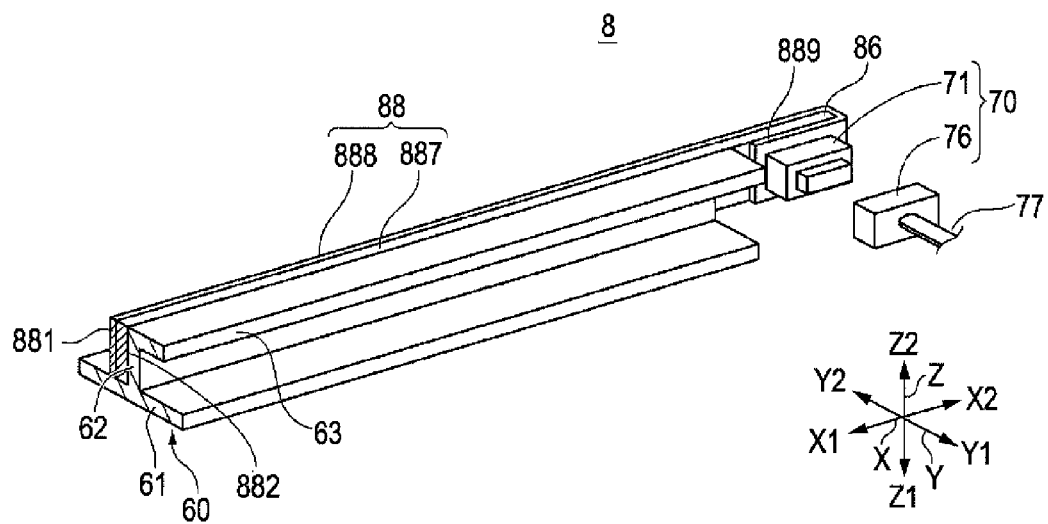

FIGS. 5A and 5B are schematic diagrams illustrating the configuration in the vicinity of the light source substrate 88 used in the illumination apparatus 8 of the display apparatus 100 according to the first embodiment of the invention; FIG. 5A is a diagram schematically illustrating the light source substrate 88 from one surface 881, whereas FIG. 5B is a diagram schematically illustrating the light source substrate 88 from another surface 882. Note that the configurations of the light-emitting elements 89, light source substrates 88, and so on disposed on the two side-end surfaces 801 and 802 (the light-entry portions 80a) that oppose each other in the Y-axis direction of the light guiding plate 80 are the same. Accordingly, FIG. 5A illustrates the light-emitting elements 89, the light source substrate 88, and so on disposed on the side-end surface 802 of the light guiding plate 80, whereas FIG. 5B illustrates the light-emitting elements 89, the light source substrate 88, and so on disposed on the side-end surface 801 of the light guiding plate 80.

As shown in FIGS. 3, 4A, and 4B, the illumination apparatus 8 includes: the light guiding plate 80 disposed so as to overlap with the bottom surface of the display panel 10; and the plurality of light-emitting elements 89 arranged from one end of the light-entry portions 80a (the one side X1 in the X-axis direction) toward the other end (the other side X2 in the X-axis direction) with their light-emitting surfaces 89a facing toward the light-entry portions 80a of the light guiding plate 80. In this embodiment, the plurality of light-emitting elements 89 are mounted on one surface 881 of the light source substrate 88 that extends in the X-axis direction following the light-entry portions 80a. The light-emitting elements 89 are LEDs (light-emitting diodes) that emit white light, and emit light source light as divergent light.

In the illumination apparatus 8 according to this embodiment, of the side-end surfaces 801, 802, 803, and 804 of the light guiding plate 80, the two side-end surfaces 801 and 802 opposite to each other in the Y-axis direction are used as the light-entry portions 80a. For this reason, the plurality of light-emitting elements 89 have their light-emitting surfaces 89a pointed toward the two light-entry portions 80a (the side-end surfaces 801 and 802) of the light guiding plate 80, and are arranged from one end toward the other end of each of the two light-entry portions 80a (the side-end surfaces 801 and 802). Meanwhile, the light source substrates 88 are disposed extending along the two light-entry portions 80a (the side-end surfaces 801 and 802), respectively, and the plurality of light-emitting elements 89 are mounted on the respective one surfaces 881 of the two light source substrates 88.

In this embodiment, the light guiding plate 80 is a light-transmissive resin plate configured of an acrylic resin, a polycarbonate resin, or the like, and is disposed between a bottom surface 80c of the light guiding plate 80 and the base plate portion 45 of the first frame 40 with a reflective sheet 187 overlapping thereupon. Meanwhile, an optical sheet such as the diffusion sheet 182, the prism sheets 183 and 184, or the like are disposed in an overlapping manner between a top surface (a light-emitting surface 80b) of the light guiding plate 80 and the display panel 10. In this embodiment, the two prism sheets 183 and 184 are disposed so that their respective ridgelines are orthogonal to each other. Accordingly, illumination light emitted from the light-emitting surface 80b of the light guiding plate 80 is diffused in all directions by the diffusion sheet 182, and is then imparted with directionality by the two prism sheets 183 and 184 so as to have a peak in the forward direction of the display panel 10. A scattering pattern configured of fine concave recesses, the printed layer of a scattering member, or the like is formed on the surface of the light guiding plate 80 located on the side of the reflective sheet 187, and in this embodiment, the density of the scattering pattern becomes greater as the pattern progresses away from the light-emitting elements 89. Accordingly, the intensity distribution of the illumination light emitted from the light guiding plate 80 is made uniform regardless of the distance from the light-emitting elements 89. In this embodiment, many fine recesses 80e are provided in the bottom surface 80c of the light guiding plate 80 as the scattering pattern.

Steps are formed from area to area in a region of the base plate portion 45 of the first frame 40 that overlaps with the side of the light guiding plate 80 in which the side-end surface 801 is located so that a gap can be secured between the bottom surface 80c of the light guiding plate 80 and the first frame 40, and are bent toward the light guiding plate 80. Through this, the reflective sheet 187 and bottom plate portions 61 of light source support members 60 can be held in the gap between the bottom surface 80c of the light guiding plate 80 and the base plate portion 45. Meanwhile, a recess portion is formed on the rear surface side of the first frame 40 by bending the base plate portion 45 of the first frame 40 toward the light guiding plate 80 partially, and thus the flexible wiring boards 200 are bent as far as the bottom surface (rear surface) of the base plate portion 45 of the first frame 40 and the circuit board 250 is accommodated within the depth of the recess portion. Accordingly, the illumination apparatus 8 can be made thinner.

In this embodiment, the light source substrates 88 are disposed so that the one surfaces 881 on which the light-emitting elements 89 are mounted oppose the light-entry portions 80a of the light guiding plate 80. In addition, the light source substrates 88 are structured so that a wiring pattern, lands, and so on are provided along with an insulating layer on the one surfaces 881 of plate-shaped metallic plates 887 (support plates) that extend along the light-entry portions 80a. This configuration can be realized by affixing, to the one surfaces 881 of the metallic plates 887, a flexible wiring board 888 in which a resin base layer, a wiring pattern, and an insulating protective layer or the like are stacked in that order. Accordingly, the lands on which the wiring pattern and the chips for the light-emitting elements 89 are mounted are electrically insulated from the metallic plates 887. In this embodiment, the metallic plates 887 are configured of aluminum plates, and the metallic plates 887 ensure the mechanical strength of the light source substrates 88 and also function as heat dissipation plates that dissipate the heat from the light-emitting elements 89.

As shown in FIGS. 3, 4A, 4B, 5A, and 5B, the light source support members 60 that hold the light source substrates 88 are provided toward each another surface 882 of the light source substrates 88, and the light source support members 60 are disposed and held between the first frame 40 and the second frame 30. In this embodiment, the light source support members 60 are bar-shaped metallic components that extend along the other surfaces 882 of the light source substrates 88. Each of the light source support members 60 includes the bottom plate portion 61 that overlaps with the base plate portion 45 of the first frame 40, and a substrate support plate portion 62 that configures a wall surface protruding upward from a location partway along the width direction of the bottom plate portion 61. Furthermore, each of the light source support members 60 includes, toward the upper end of the substrate support plate portion 62 (the side on the opposite side as the bottom plate portion 61), an upper plate portion 63 bent from the substrate support plate portion 62 in the opposite direction as the side on which the light guiding plate 80 is located, and the upper plate portion 63 is anchored to the upper plate portion 55 of the third frame 50 and at least one of upper plate portions 315 and 325 of the second frame 30 using screws or the like.

In the light source support members 60 configured in this manner, the surfaces of the substrate support plate portions 62 on the side on which the light guiding plate 80 is located correspond to substrate holding surfaces 620 that hold the light source substrates 88, and the light source substrates 88 are anchored to the substrate holding surfaces 620 using screws or the like. In this state, the entire surface of each another surface 882 (the metallic plate 887) of the light source substrate 88 makes surface contact with the substrate holding surface 620 of the light source support member 60, and overlaps in a tightly-fitting state. The light source support members 60, meanwhile, are made of a metal such as aluminum, a ferrous metal, or the like. Accordingly, heat produced by the light-emitting elements 89 is transmitted to the light source support members 60 from the metallic plates 887 of the light source substrates 88, and the heat in the light source support members 60 is then transmitted to the first frame 40. This makes it possible to greatly suppress a rise in the temperature of the light-emitting elements 89.

Configuration of Connector Member 71

FIG. 6 is a schematic diagram illustrating, from above, the configuration of the main elements of the illumination apparatus 8 used in the display apparatus 100 according to the first embodiment of the invention.

As shown in FIGS. 5A, 5B, and 6, in the illumination apparatus 8 according to this embodiment, the connector member 71, which includes a connection surface, is mounted to the another surface 882 side of each light source substrate 88 (the opposite side as the side on which the light guiding plate 80 is located) on the two side-end surfaces 801 and 802 (light-entry portions 80a) that oppose each other in the Y-axis direction of the light guiding plate 80, at one end of each light source substrate 88 in the lengthwise direction thereof. More specifically, an end portion of the light source substrate 88 located on the one side X2 in the X-axis direction corresponds to a protrusion portion 86 that protrudes beyond an end portion of the light source support members 60 located on the one side X2 in the X-axis direction, and the connector member 71 is provided on the other surface 882 side (the outer side) of the protrusion portion 86. Accordingly, the connector members 71 mounted on the two respective light source substrates 88 are disposed being shifted toward the same side (the X2 side) in the X-axis direction. Here, on both the side-end surfaces 801 and 802 that serve as the light-entry portions 80a of the light guiding plate 80, the connecting surfaces of the connector members 71 face toward the opposite side as the side on which the light guiding plate 80 is located, rather than being disposed so as to oppose the light guiding plate 80. Accordingly, because the connector members 71 are disposed so that their connecting surfaces face outward, the task of connecting can be carried out easily in the case where the light source driving unit 280 is disposed on the outside (the exterior) of the first frame 40. Note that the "connecting surface" of the connector member 71 refers to the surface of the connector member 71 to which the connector member 76 is connected as a pair. Here, one of the connector member 71 and the connector member 76 is a male connector, and the other is a female connector. In the case of a male connector, a terminal is formed in a convex connecting surface, whereas in the case of a female connector, a terminal is formed in a concave connecting surface.

In this embodiment, an end portion 889 of the flexible wiring board 888 on the one side X2 in the X-axis direction (that is, one portion of the flexible wiring board 888) is formed having a length that is greater than the length of the metallic plate 887 in the direction that plate extends (the lengthwise direction), and the portion that has been formed longer is bent back toward the other surface 882 of the metallic plate 887 so as to cover the side surface of the end of the metallic plate 887. The end portion 889 of the flexible wiring board 888 is mounted to the connector member 71 so that the connecting surface is disposed facing outward (that is, toward the opposite side as the metallic plate 887). Furthermore, the end portion 889 of the flexible wiring board 888 is anchored to the other surface 882 of the metallic plate 887 using an adhesive or another such method, and the connector member 71 is anchored to the metallic plate 887 via the end portion 889 of the flexible wiring board 888. In addition, on the one surface 881 of the light source substrate 88, the light-emitting elements 89 are not mounted in regions that overlap with the location where the connector member 71 is provided, and the connector member 71 is provided further toward the end of the light source substrate 88 in the lengthwise direction thereof than the light-emitting element 89 that, of the plurality of light-emitting elements 89, is located on the end.

Meanwhile, the connector member 76 that configures the connector 70 along with the connector member 71 is connected to the leading end of the flexible wiring 77, such as lead lines, a flexible wiring board, or the like, that extends from the light source driving unit 280 as shown in FIG. 1B. Accordingly, if the connector members 71 and 76 are connected, the light source driving unit 280 can supply power to the light-emitting elements 89 via the wiring 77, the connector 70, and the flexible wiring board 888.

In the illumination apparatus 8 configured in this manner, only the light-emitting elements 89 protrude toward the light guiding plate 80 from the light source substrate 88. Accordingly, in the light guiding plate 80, the side-end surfaces 801 and 802 serving as the light-entry portions 80a extend linearly in the X-axis direction, and no cutouts or the like are formed.

In addition, in this embodiment, the light source driving unit 280 is disposed below the base plate portion 45 of the first frame 40, and thus a cutout 450 is formed in the base plate portion 45 of the first frame 40 for leading the wiring 77 to below the base plate portion 45 of the first frame 40.

Main Effects of this Embodiment

As described thus far, with the illumination apparatus 8 and display apparatus 100 according to this embodiment, the plurality of light-emitting elements 89 are disposed following the light-entry portion 80a of the light guiding plate 80, and the plurality of light-emitting elements 89 are mounted to the rigid light source substrate 88 that extends along the light-entry portion 80a. In addition, the connector member 71 is held by the light source substrate 88. Accordingly, power can be supplied to the light-emitting elements 89 via the connector member 71. It is thus unnecessary to lead the flexible wiring out from the light source substrate 88, and as a result, the light source substrate 88 does not deform as a large load not being applied to the light source substrate 88 via the wiring during assembly. Furthermore, the optical axes of the light-emitting elements 89 do not tilt as a result of deformation of the light source substrate 88.

In addition, the light-emitting elements 89 are mounted on the one surface 881 side of the light source substrate 88 (the side where the light guiding plate 80 is located), and the connector member 71 is held on the another surface 882 side of the light source substrate 88. Accordingly, it is not necessary to provide a cutout in the light guiding plate 80 in order to avoid interference between the light guiding plate 80 and the connector member 71. For this reason, the light-entry portions 80a extend in linear form, and the illumination area is thus large. Furthermore, even in the case where the connector members 71 and 76 are connected after the light source substrate 88 is disposed relative to the light guiding plate 80, the light guiding plate 80 does not interfere, and thus the task of connecting the connector members 71 and 76 can be carried out with ease.

In addition, the light source substrate 88 includes the metallic plate 887 that serves as a support plate and the flexible wiring board 888 that is affixed to the one surface 881 side of the metallic plate 887, and the end portion 889 of the flexible wiring board 888 (one portion of the flexible wiring board 888) is bent back toward the another surface 882 side and connected to the connector member 71 without being affixed to the one surface 881 of the metallic plate 887. Accordingly, there is an advantage in that separate wiring need not be extended from the one surface 881 side of the light source substrate 88 toward the connector member 71 on the other surface 882 side.

In addition, with the light source substrate 88, the metallic plate 887 is used as a support plate. Furthermore, the substrate support plate portion 62 of the metallic light source support member 60 is disposed so as to overlap with the metallic plate 887 that configures the other surface 882 of the light source substrate 88. Accordingly, heat produced by the light-emitting elements 89 can escape through the light source substrate 88, the light source support member 60, and the metallic first frame 40.

Second Embodiment

FIG. 7 is a schematic diagram illustrating, from above, the configuration of the main elements of the illumination apparatus 8 used in the display apparatus 100 according to a second embodiment of the invention. Note that the basic configuration in this embodiment is the same as that in the first embodiment, and thus corresponding constituent elements will be given the same reference numerals, and descriptions thereof will be omitted.

Although a single connector member 71 is provided for the light source substrate 88 in the first embodiment, a plurality of connector members 71 may be provided at locations that are distanced in the lengthwise direction of the light source substrate 88. For example, with the illumination apparatus 8 illustrated in FIG. 7, connector members 71 are provided at both ends of the light source substrate 88. In other words, in this embodiment, the connector members 71 are held on the other surface 882 side of the light source substrate 88, and thus there are extremely few restrictions on the number of connector members 71. Accordingly, a number of connector members 71 that is suited to supplying power to the light-emitting elements can be provided. Furthermore, even in the case where the number of the light-emitting elements 89 has been increased due to implementing a greater size for the display screen of the display apparatus 100, power can be supplied to the light-emitting elements 89 via the plurality of connector members 71.

Third Embodiment

Figure 8A:
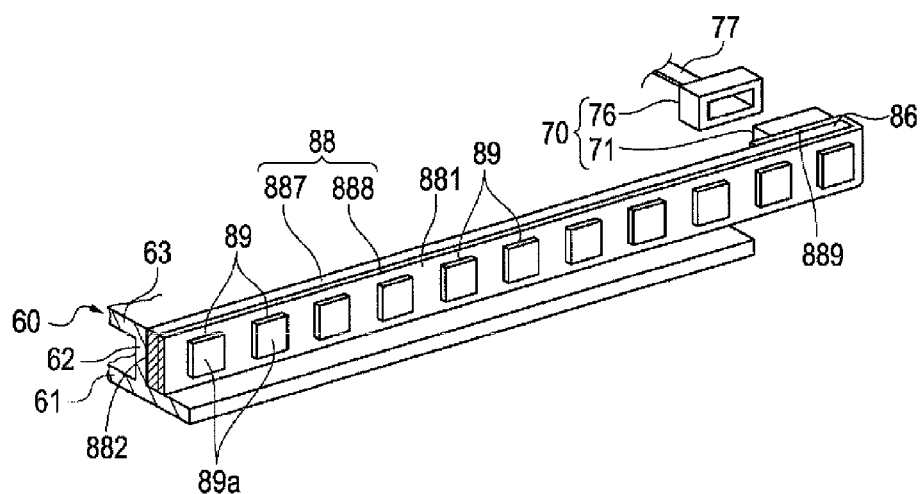
FIGS. 8A and 8B are schematic diagrams illustrating the configuration in the vicinity of a light source substrate used in an illumination apparatus of a display apparatus according to a third embodiment of the invention.
Figure 8B:
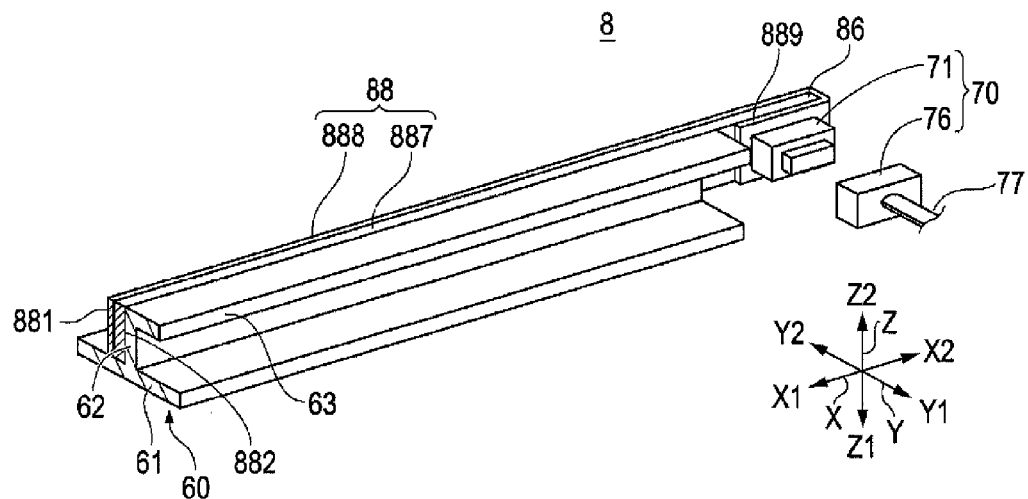

FIGS. 8A and 8B are schematic diagrams illustrating the configuration in the vicinity of the light source substrate 88 used in the illumination apparatus 8 of the display apparatus 100 according to a third embodiment of the invention; FIG. 8A is a diagram schematically illustrating the light source substrate 88 from one surface 881, whereas FIG. 8B is a diagram schematically illustrating the light source substrate 88 from the another surface 882. Note that the configurations of the light-emitting elements 89, light source substrates 88, and so on disposed on the two side-end surfaces 801 and 802 (the light-entry portions 80*a*) that oppose each other in the Y-axis direction of the light guiding plate 80 are the same. Accordingly, FIG. 8A illustrates the light-emitting elements 89, the light source substrate 88, and so on disposed on the side-end surface 802 of the light guiding plate 80, whereas FIG. 8B illustrates the light-emitting elements 89, the light source substrate 88, and so on disposed on the side-end surface 801 of the light guiding plate 80.

In the aforementioned first and second embodiments, the configuration is such that when providing the connector member 71 on the end portion of the light source substrate 88, the light-emitting elements 89 are not mounted in a region that overlaps with the location in which the connector member 71 is provided on the one surface 881 of the light source substrate 88; however, as shown in FIGS. 8A and 8B, a configuration in which the light-emitting elements 89 are mounted in a region that overlaps with the location in which the connector member 71 is provided on the one surface 881 of the light source substrate 88 is employed. In other words, the light-emitting elements 89 are mounted so as to extend to the end portion of the light source substrate 88, and the connector member 71 is disposed on the rear surface side of the outermost light-emitting element 89 so as to at least partially overlap with the region in which that light-emitting element 89 is mounted (provided). Accordingly, the light source substrate 88 protrudes from the light source support member 60 in the extension direction of the light source support member 60, the connector member 71 is disposed on the surface in the side that does not oppose the protruding overhang portion of the light guiding plate 80 (that is, on the another surface 882 side), and the corresponding connector member 76 is then connected thereto. The connector member 71 is provided on the end portion of the light source substrate 88, and is provided within a range in the lengthwise direction of the light source substrate 88 in which the plurality of light-emitting elements 89 are disposed. According to this configuration, even in the case where the connector member 71 is used, the width dimension of the light source substrate 88 (that is, the dimension in the X-axis direction) can be kept to a minimum. In other words, in the light source substrate 88, providing the connector member 71 on the rear surface that does not oppose the light guiding plate 80 makes it possible to arrange and dispose the light-emitting elements 89 as far as the end portion of the light source substrate 88. Accordingly, light can enter from the end portion of the light guiding plate 80 in the direction in which the light-emitting elements 89 are arranged (the X-axis direction), which makes it possible to effectively utilize even the regions at the end portion of the light guiding plate 80 as the illumination apparatus 8 without waste.

Fourth Embodiment

FIG. 9 is a schematic diagram illustrating, from above, the configuration of the main elements of the illumination apparatus 8 used in the display apparatus 100 according to a fourth embodiment of the invention. Note that the basic configuration in this embodiment is the same as that in the first embodiment, and thus corresponding constituent elements will be given the same reference numerals, and descriptions thereof will be omitted.

As shown in FIG. 9, two connector members 71 are provided in locations of the light source substrate 88 that are distanced from each other in the lengthwise direction thereof in this embodiment, in the same manner as in the second embodiment. Here, of the plurality of connector members 71, one connector member 71 (a connector member 711) is provided at an end portion of the light source substrate 88. On the other hand, the other connector member 71 (a connector member 712) is provided in approximately the center of the light source substrate 88 in the lengthwise direction thereof, and is provided within the range in which the plurality of light-emitting elements 89 are disposed. In other words, in this embodiment, the connector members 71 are held on the another surface 882 side of the light source substrate 88, and thus there are extremely few restrictions on the locations in which the connector members 71 are disposed. Accordingly, a number of connector members 71 that is suited to supplying power to the light-emitting elements can be provided. Furthermore, even in the case where the number of the light-emitting elements 89 has been increased due to implementing a greater size for the display screen of the display apparatus 100, power can be supplied to the light-emitting elements 89 via the connector member 71 provided on the end portion of the light source substrate 88 (the connector member 711) and the connector member 71 provided in approximately the center of the light source substrate 88 in the lengthwise direction thereof (the connector member 712).

Note that in the case where the connector member 71 (the connector member 712) is provided in approximately the center of the light source substrate 88 in the lengthwise direction thereof, the substrate support plate portion 62 of the light source support member 60 and so on described with reference to FIGS. 5A and 5B may be cut out from area to area and the connector member 71 disposed on the other surface 882 of the light source substrate 88. Furthermore, to electrically connect the connector member 71 provided in approximately the center of the light source substrate 88 in the lengthwise direction thereof (that is, the connector member 712) to the light-emitting elements 89, a portion branching from an area partway along the lengthwise direction of the flexible wiring board 888 (that is, a part of the flexible wiring board 888) may be bent back toward the other surface 882 of the light source substrate 88 and connected to the connector member 712.

Other Embodiments

Although the aforementioned embodiments describe an example in which two connector members 71 are provided as an example in which a plurality of connector members 71 are provided for a single light source substrate 88, three or more connector members 71 may be provided instead.

Although the aforementioned fourth embodiment describes an example in which a connector member 71 is provided on an end portion of the light source substrate 88 and in approximately the center of the light source substrate 88 in the lengthwise direction thereof, the connector member 71 may also be provided only in approximately the center of the light source substrate 88 in the lengthwise direction thereof.

Although the aforementioned first through fourth embodiments have the same configurations for the light-emitting elements 89, the light source substrate 88, and the connector member 71 on both the side-end surface 801 side of the light guiding plate 80 and the side-end surface 802 side of the light guiding plate 80, the side-end surface 801 side of the light guiding plate 80 and the side-end surface 802 of the light guiding plate 80 may have different configurations. In addition, although the invention is applied on both the side-end surface 801 side of the light guiding plate 80 and the side-end surface 802 side of the light guiding plate 80 in the aforementioned first through fourth embodiments, the invention may be applied only in one of those sides.

Although the light-emitting elements 89, light source substrate 88, and connector member 71 are provided on both the side-end surface 801 side of the light guiding plate 80 and the side-end surface 802 side of the light guiding plate 80 in the aforementioned first through third embodiments, the invention may be applied in an illumination apparatus 8 in which the light-emitting elements 89, light source substrate 88, and connector member 71 are provided in only one of those sides.

Example of Installation in Electronic Device

Although the aforementioned embodiments describe an LCD television as an example of the electronic device 2000 in which the display apparatus 100 is installed, the display apparatus 100 in which the invention is applied may also be used in the display units of electronic devices such as personal computer displays, digital signage, car navigation devices, and mobile information terminals, in addition to LCD televisions.

The entire disclosure of Japanese Patent Application No. 2011-161707, filed Jul. 25, 2011 is expressly incorporated by reference herein.

What is claimed is:

1. An electronic device comprising:
 a light modulation device;
 a light guiding member including a light-entry portion and a light-emitting portion;
 a light-emitting element including a light-emitting surface and a mounting surface different from the light-emitting surface, the light-emitting surface emits a first light toward the light-entry portion of the light guiding member, the first light is entered into the light guiding member and emitted as a second light from the light-emitting portion of the light guiding member toward the light modulation device; and
 a light source substrate including a support plate and a flexible wiring board that has a first part and a second part, the first part is affixed to one surface of the support plate and includes a light-emitting element mounting region on which the light emitting element is mounted so that the mounting surface of the light-emitting element faces the light-emitting element mounting region, and the second part of the flexible wiring board extends along the support plate and over an end thereof,
 the second part of the flexible wiring board being bent from the first part toward a side of another surface of the support plate opposite to the one surface and connected to a connector member which supplies power to the light-emitting element.

2. The electronic device according to claim 1, wherein the second part of the flexible wiring board is positioned without being affixed to the one surface of the support plate.

3. The electronic device according to claim 1, wherein the second part of the flexible wiring board is bent back toward the side of the another surface of the support plate, and a part of the second part is affixed to the another surface of the support plate.

4. The electronic device according to claim 1, wherein the support plate is a metal plate.

5. The electronic device according to claim 1, wherein the connector member includes a first connector member and a second connector member, the first connector member is disposed on the side of the another surface of the support plate and the second connector member is configured to attach to the first connector member.

6. The electronic device according to claim 5, wherein the first connector member is disposed on a same surface side of the flexible wiring board on which the light-emitting element is mounted.

7. An illumination device comprising:
 a light guiding member including a light-entry portion and a light-emitting portion;
 a light-emitting element which emits a first light toward the light-entry portion of the light guiding member, the first light is entered into the light guiding member and emitted as a second light from the light-emitting portion of the light guiding member; and
 a light source substrate including a metal plate and a flexible wiring board that has a first part and a second part, a first side of the first part is affixed to one surface of the metal plate and a second side of the first part opposite to the first side mounts the light-emitting element, the second part is extending from the first part and over an end of the metal plate,
 the second part of the flexible wiring board being bent from the first part and connected to a connector member which supplies power to the light-emitting element,
 wherein the connector member includes a first connector member and a second connector member, the first connector member is disposed on a side of another surface of the metal plate, and the second connector member is configured to attach to the first connector member.

8. The illumination device according to claim 7, the light-emitting element includes a light-emitting surface and the light-emitting surface emits the first light, wherein the light-emitting surface positioned on a same side with the second side with respect to the metal plate.

9. The illumination device according to claim 7, wherein the second part of the flexible wiring board is positioned without being affixed to the one surface of the metal plate.

10. The illumination device according to claim 7, wherein the second part of the flexible wiring board is bent back toward a side of another surface of the metal plate, and a part of the second part is affixed to the side of the another surface.

11. The illumination device according to claim 7, wherein the first connector member is disposed on a same surface of the flexible wiring board on which the light-emitting element is mounted.

12. An electronic device comprising the illumination device according to claim 7.

13. An illumination device comprising:
a light guiding member including a light-entry portion and a light-emitting portion;
a light-emitting element which emits a first light toward the light-entry portion of the light guiding member, the first light is entered into the light guiding member and emitted as a second light from the light-emitting portion of the light guiding member; and
a light source substrate including a metal plate and a flexible wiring board that has a first part and a second part, the first part is affixed to one surface of the metal plate, the second part is extending from the first part, the second part of the flexible wiring board being bent from the first part and connected to a connector member which supplies power to the light-emitting element, wherein the connector member includes a first connector member and a second connector member, the first connector member is disposed on a side of another surface of the metal plate, and the second connector member is configured to attach to the first connector member.

14. The illumination device according to claim 13, wherein the light-emitting element is mounted on the first part of the flexible wiring board.

15. The illumination device according to claim 13, the light-emitting element includes a light-emitting surface and the light-emitting surface emits the first light, wherein
the light-emitting surface positioned on a same side with the one surface with respect to the metal plate.

16. The illumination device according to claim 13, wherein the second part of the flexible wiring board is bent back toward a side of another surface of the metal plate, and a part of the second part is affixed to the side of the another surface.

17. The illumination device according to claim 13, wherein the first connector member is disposed on a same surface of the flexible wiring board on which the light-emitting element is mounted.

18. An electronic device comprising the illumination device according to claim 13.

* * * * *